Patented Apr. 7, 1942

2,278,528

UNITED STATES PATENT OFFICE 2,278,528

COPOLYMERIZED SUBSTANCE COMPRISING A FORMYL GROUP

Carl E. Barnes, Worcester, Mass., assignor, by mesne assignments, to E. I. du Pont de Nemours & Company, Wilmington, Del., a corporation of Delaware No Drawing. Application April 13, 1939, Serial No. 267,605

3 Claims. (Cl. 260—84)

This invention relates to synthetic resins and optical bodies made therefrom, and more particularly to copolymerized unsaturated methylene compounds.

Polymerized methyl methacrylate and many other resins containing a single unsaturated methylene group $CH_2=$, especially those having the grouping $$CH_2=C-\!\!\!\!\underset{R}{|}$$

in which R may be hydrogen or a methyl group are transparent and adapted for use in the optical fields, but they have the disadvantages that for some purposes they are not hard enough to resist the ordinary abrasions to which they may be subjected and, furthermore, they cannot be ground and polished by standard methods to provide an accurate optical surface.

In accordance with my experimentation, I have found that a desired polymerizable base substance forming linear polymers may be copolymerized with compounds containing both a single unsaturated methylene group and a formyl group, and that the resultant product is much harder than the polymerized base substance, although still fusible and moldable, and that the substance is thereby rendered available for many desired uses.

An object of this invention is, therefore, to provide copolymerized resins of this type in which the hardness characteristics of a selected base substance are materially modified by such a hardening agent.

A further object is to make optical bodies which are transparent and have desired optional characteristics and to provide the same with highly accurate optical surfaces by both molding and polishing operations.

Other objects are to provide copolymerized resins which may be used as bonds for various types of granular material and to provide abrasive articles formed thereby. Further objects will be apparent in the following disclosure.

In accordance with this invention, I propose to copolymerize a base substance, such as methyl methacrylate, containing a single polymerizable unsaturated methylene group per molecule with a miscible and compatible amount of a hardening agent containing both a formyl group and the unsaturated methylene group $CH_2=$, and particularly with vinyl formate and isopropenyl formate. As shown by the formulae $$H-\overset{O}{\overset{\|}{C}}-O-CH=CH_2$$

and

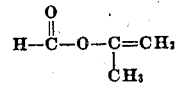

each of these compounds includes the unsaturated methylene group $CH_2=$; hence, these compounds are capable of interpolymerizing with other substances forming linear polymers, in which the formyl group is a substituent on the chain carrying the unsaturated methylene groups. This formyl group appears to have polar properties or the capacity to attract like groups on the same or other chains and thus to act as if these groups were connected by weak bonds which tend to render the chains more sluggish in their movement and, therefore, serve to raise the softening point and increase the hardness of the substance, as well as to decrease its solubility. Consequently, the presence of the formyl group serves to increase the hardness characteristics of the chosen base substance without rendering it infusible, as would be the case if one used a cross linking agent containing two or more unsaturated methylene groups per molecule. That is, the copolymer with its higher softening point is still moldable under heat and pressure; but its hardness is increased by the use of an adequate amount of the hardening agent, so that the copolymer may have its surface accurately shaped by a grinding and polishing operation.

The base substances which are to be interpolymerized with vinyl formate and isopropenyl formate should be so selected and proportioned that the substances are compatible and the monomers are miscible and the polymerized resin is soluble in one or both of the monomers so that an apparently homogenous massive body may be formed therefrom. The base substances which are usefully modified by vinyl formate and isopropenyl formate are found in the following groups:

1. Derivatives of acrylic acid and methacrylic acid, such as their esters, amides and halides.
2. Vinyl esters.
3. Polymerizable substituted ethylenes.
4. Mono-vinyl ketones.
5. Mono-vinyl ethers.
6. Mono-vinyl aldehydes.

While many other polymerizable base substances may be used within the scope of my invention, the following are given as examples of those substances in the above groups which are usable with my hardening agents:

1. The esters of acrylic acid and methacrylic acid comprise the methyl, ethyl, isopropyl and ter-butyl acrylates and methacrylates, as well as other alkyl esters of these acids. They also comprise aryl esters, such as phenyl or benzyl acrylate or methacrylate and paracyclohexylphenyl acrylate or methacrylate. Acryl and methacryl amides and chlorides may also be used.

2. The lower vinyl esters comprise vinyl acetate, propionate, butyrate, etc.

3. The preferred substituted ethylenes are styrene, furyl ethylene, vinyl chloride and nitro-, ethylene.

4. The preferred mono-vinyl ketones comprise methyl vinyl ketone and isopropenyl methyl ketone.

5. The mono-vinyl ethers comprise methyl vinyl ether, phenyl vinyl ether and similar substances.

6. Examples of mono-vinyl aldehydes are acrolein and alpha methyl acrolein.

Methyl methacrylate polymerizes by itself to form a transparent resin having a Rockwell hardness of about 38 to 40 and a refractive index of about 1.490. It may be molded under pressure at 125° C. This base substance may be interpolymerized with vinyl formate or isopropenyl formate in any proportions in which the two substances are miscible and in which the copolymer is soluble in the monomeric liquid. For example, I may use 15% of vinyl formate or isopropenyl formate and thereby increase the hardness of the base substance to such an extent that the material may now be shaped by a grinding and polishing operation. On the other hand, its softening point is sufficiently low so that it may also be molded at 175° C. under an available pressure. Owing to this increased hardness over that of the base substance, the molded body may now be further polished by suitable and standard abrasive operations well known in the optical industry, and the material may thus be provided with an extremely accurate optical surface.

If it is desired to change the index of refraction or the dispersion of such copolymers, this may be accomplished by the addition to the monomeric mixture of another modifying agent which has suitable optical properties. For this purpose, I may use an inert non-polymerizable substance, such as the chlorinated diphenyls, anthracene, triphenyl benzene and chloro-naphthalene and other substances which are miscible with the monomers and do not cause detrimental effects during polymerization. I may also use various polymerizable substances that are compatible, such as styrene, which will raise the refractive index of the resulting polymer of methyl methacrylate and vinyl formate. Other high index agents are the acrylic and methacrylic acid esters of the hydroxyquinolines, the hydroxydiphenyls, the nitrophenols and the chlorophenols. Other suitable agents are nitroethylene, triphenylmethyl acrylate or methacrylate, and ortho-, meta-, or para-nitro-styrene. Vinyl chloride and acetate have low indices and are useful. The index of refraction of such an interpolymer is proportional to the amount of the index modifying agent used and will range between the end values of the substances employed. That is, if 5% of the index agent modifies the index of the vinyl formate polymer by a certain amount, 10% of the agent will double that amount.

The monomeric substances may be interpolymerized by suitable procedure. For example, the miscible monomers may be placed in a mold and heated with or without the aid of a catalyst, such as benzoyl peroxide, at a temperature of 60° C. for one day and thereafter the substance may be given a further heat treatment for a period of ten hours or so at a temperature of 120° C., or other suitable temperature which will serve to complete the polymerization or otherwise effect a further hardening of the resin. Thereafter the material may be stripped from the mold and polished on a suitable optical grinding machine to provide a required curvature for use as a lens. The material may be thus shaped to form either lenses, prisms, mirrors, plates or other desired objects of utility in the industry.

The synthetic resins above described are also adapted for use as bonding agents for granular materials, such as abrasive grains, and they serve either to form a massive grinding wheel or other shaped article or a flexible abrasive article wherein the abrasive grains are cemented to a paper or cloth backing by means of the resin. The properties of the bonded article will be varied in accordance with the relative amounts of the materials used. Various procedures may be adopted for forming such articles. If abrasive grains, such as crystalline alumina, silicon carbide, boron carbide or diamonds, are to be bonded by such polymers, the mixture of monomeric substances may be incorporated with the abrasive grains in the desired proportions and the bond polymerized in situ by heat, with or without the aid of catalysts, such as benzoyl peroxide. Any standard polymerization procedure may be employed for making the linear polymers and copolymers above mentioned. Suitable procedure may be adopted for making such bonded articles in accordance with the methods set forth in the patent of Kistler and Barnes No. 2,218,795 of October 22, 1940, and their application Serial No. 228,004 filed September 1, 1938. For example, a grinding wheel may be made by placing a desired amount of the abrasive grains in a mold and then pouring into the mold a sufficient amount of the bond mixture to fill the interstices between the grains, after which the mold is subjected to heat for polymerizing the bond in place. Also, since the copolymers may be softened by heat, then one may make the bond as a granular substance by precipitating it during polymerization or by grinding to particle form a massive piece of a suitable copolymer. This may be mixed with the abrasive grains, together with a plasticizing medium, if desired, such as any suitable solvent which includes the monomeric polymerizable base substance. The mixture of grains and bond may be shaped in a mold with the aid of sufficient heat and pressure to cause the bond to soften and adhere to the grains. The monomeric polymerizable plasticizer may be used in sufficient amount to wet the grains and be solidified by polymerization so that no liquid remains in the finished article, Other suitable procedures as set forth in the prior applications may be employed with the base substance and the modifying agent herein disclosed, and this invention is deemed to cover the products thus made.

It is also to be understood that while I have attempted to explain this invention in the light of the present accepted theories, yet the claims are not to be construed as dependent on any particular theory relative to the formation of the polymers and their use. Also, the examples above given are to be interpreted solely as illustrative of the invention and not as limitations thereon, except as set forth in the claims appended hereto.

I claim:

1. An optical body formed of a polymerized base substance comprising methyl methacrylate copolymerized with approximately 15% of a substance selected from the group consisting of vinyl formate and isopropenyl formate and which has accurately shaped optical surfaces.

2. A synthetic resin comprising methyl methacrylate copolymerized with approximately 15% of vinyl formate.

3. A synthetic resin comprising methyl methacrylate copolymerized with approximately 15% of isopropenyl formate.

CARL E. BARNES.